United States Patent
Yeh et al.

(10) Patent No.: US 8,106,147 B2
(45) Date of Patent: Jan. 31, 2012

(54) HIGH STRENGTH POLYIMIDE MEMBRANE AND METHOD FOR FORMING THE SAME

(75) Inventors: Jui-Ming Yeh, Tao-Yuan (TW);
Kuan-Yeh Huang, Tao-Yuan (TW);
Yu-Sian Jhuo, Tao-Yuan (TW);
Chang-Jian Weng, Tao-Yuan (TW)

(73) Assignee: Chung Yuan Christian University, Tao-Yuan (TW)

( * ) Notice: Subject to any disclaimer, the term of this patent is extended or adjusted under 35 U.S.C. 154(b) by 20 days.

(21) Appl. No.: 12/837,300

(22) Filed: Jul. 15, 2010

(65) Prior Publication Data

US 2011/0137008 A1  Jun. 9, 2011

(30) Foreign Application Priority Data

Dec. 7, 2009  (TW) ............................. 98141779 A

(51) Int. Cl.
*C08G 63/00* (2006.01)
*C08G 63/02* (2006.01)

(52) U.S. Cl. ......... 528/208; 528/310; 528/313; 528/332
(58) Field of Classification Search ................ 528/310, 528/313, 332, 208
See application file for complete search history.

(56) References Cited

U.S. PATENT DOCUMENTS

| 6,518,394 | B2 | 2/2003 | Wei et al. | |
|---|---|---|---|---|
| 2001/0034421 | A1 | 10/2001 | Wei et al. | |
| 2010/0313752 | A1* | 12/2010 | Powell et al. | ...................... 95/45 |

* cited by examiner

*Primary Examiner* — Terressa Boykin
(74) *Attorney, Agent, or Firm* — Stout, Uxa, Buyan & Mullins, LLP

(57) ABSTRACT

The present invention discloses a polyimide membrane synthesized by one or more emeraldine amine-capped aniline trimer oligomers, one or more dianhydrides, and an optional diamine, whereby the weight-average molecular weight of the polyimide membrane ranges from 50,000 to 200,000, and the Young's Modulus of the polyimide membrane is equal to or more than 3 GPa.

10 Claims, 3 Drawing Sheets n=1.00 (BSAA-ACAT)
n=0.75 (BSAA-ACAT/ODA(3:1))
n=0.50 (BSAA-ACAT/ODA(1:1))
n=0.25 (BSAA-ACAT/ODA(1:3))
n=0.00 (BSAA-ODA)

HIGH STRENGTH POLYIMIDE MEMBRANE AND METHOD FOR FORMING THE SAME

CROSS-REFERENCE TO RELATED APPLICATIONS

The entire contents of Taiwan Patent Application No. 098141779, filed on Dec. 7, 2009, from which this application claims priority, are incorporated herein by reference.

BACKGROUND OF THE INVENTION

1. Field of the Invention

The present invention relates to polyimide membranes, and more particularly, relates to electroactive, high strength polyimide membranes and their forming method.

2. Description of Related Art

Electroactive polymers are polymers reveal electric conductivity and have been classified as a new class of materials. In past decades, research works of electroactive polymers have been extensively made due to its potential commercial applications in electronic, optical, and biological fields.

Polyimide has been widely applied in industry due to its good thermal stability, mechanical and adhesion properties, wear resistance, chemical resistance, and low dielectric constant. Polyimide may be synthesized via condensation or addition method. The condensation method is further divided into a one-step method and two-step method.

In 1988 Wang et al. [Wang Z Y, Yang C, Gao J P, Lin J, Meng X S, Wei Y, Li S. Macromolecules 1998; 31(8): 2702-4] discovered that amine-capped aniline trimer (ACAT) reacting with anhydride will generate low yield and low molecular weight of electroactive polyimide, because the amine-capped aniline trimer reduce the probability to meet anhydride. Accordingly, Wang et al. proposed a forming method of polyimide, which is to reduce ACAT by $PtO_2/H_2$ firstly, and then the reduced ACAT is reacted with anhydride so that high yield electroactive polyimide can be obtained. However, the Wang et al. method is complicated.

In addition, polyimide synthesized by the prior art has insufficient degree of polymerization and thus is difficult to be produced in the form of a membrane. Even though a polyimide membrane could be made, its low Young's Modulus (less than 2 GPa) and poor workability limit the applications.

Accordingly, it would be advantageous to provide high strength and high molecular weight of polyimide membranes and their forming methods for improving the workability and broadening the applications.

SUMMARY OF THE INVENTION

An object of the present invention is to provide a simple, fast method to synthesize high strength, high molecular weight polyimide membranes.

One embodiment of the present invention provides a polyimide membrane that is synthesized by one or more emeraldine amine-capped aniline oligomers, one or more dianhydrides, and an optional diamine. The Young's Modulus of the synthesized polyimide membrane is equal to or more than 3 GPa.

Another embodiment of the present invention provides a polyimide membrane that is synthesized by one or more emeraldine amine-capped aniline oligomers, one or more dianhydrides, and an optional diamine. The weight-average molecular weight of the polyimide membrane ranges from 50,000 to 200,000.

The synthesized electroactive polyimide membranes of the present invention have Young's Modulus equal to or more than 3 GPa, even ultrahigh to 7 GPa. The method of the present invention is superior to the prior art by simplifying the manufacturing steps and improving the workability and strength of the polyimide membrane.

DESCRIPTION OF THE PREFERRED EMBODIMENT

Figure 1:
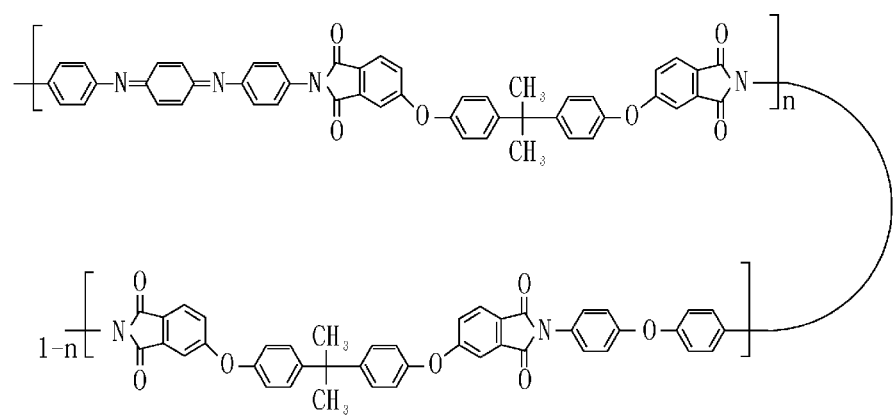
FIG. 1 shows a chemical formula of a polyimide membrane synthesized by a thermal condensation method according to an embodiment of the present invention.

Reference will now be made in detail to specific embodiments of the invention. Examples of these embodiments are illustrated in the accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a thorough understanding of the present invention. The present invention may be practiced without some or all of these specific details. In other instances, well-known components and process operations are not described in detail in order not to unnecessarily obscure the present invention.

According to the first embodiment of the present invention, a polyimide membrane is synthesized by one or more emeraldine amine-capped aniline oligomers, one or more dianhydrides, and an optional diamine. The Young's Modulus of the polyimide membrane is equal to or more than 3 GPa.

The above-mentioned dianhydride comprises one selected from the group consisting of the following:
Benzophenone tetracarboxylic dianhydride,
2,3,6,7-naphthalene tetracarboxylic dianhydride,
3,3',4,4'-diphenyl tetracarboxylic dianhydride,
1,2,5,6-naphthalene tetracarboxylic dianhydride,
2,2',3,3'-diphenyl tetracarboxylic dianhydride,
2,2-bis(3,4-dicarboxyphenyl)propane dianhydride,
3,4,9,10-perylene tetracarboxylic dianhydride,
bis(3,4-dicarboxyphenyl)ether dianhydride,
ethylene tetracarboxylic dianhydride,
naphthalene-1,2,4,5-tetracarboxylic dianhydride,
naphthalene-1,4,5,8-tetracarboxylic dianhydride,
decahydronaphthalene-1,4,5,8-tetracarboxylic dianhydride,
4,8-dimethyl-1,2,3,5,6,7-hexahydronaphthalene-1,2,5,6-tetracarboxylic dianhydride,
2,6-dichloronaphthalene-1,4,5,8-tetracarboxylic dianhydride,
2,7-dichloronaphthalene-1,4,5,8-tetracarboxylic dianhydride,
2,3,6,7-dichloronaphthalene-1,4,5,8-tetracarboxylic dianhydride,
phenanthrene-1,8,9,10-tetracarboxylic dianhydride,
cyclopentane-1,2,3,4-tetracarboxylic dianhydride,
pyrrolidine-2,3,4,5-tetracarboxylic dianhydride,
pyrazine-2,3,4,5-tetracarboxylic dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
bis(2,3-dicarboxyphenyl)sulfone dianhydride,
benzene-1,2,3,4-tetracarboxylic dianhydride,
1,2,3,4-butane tetracarboxylic dianhydride, thiophene-2,3,4,5-tetracarboxylic dianhydride, and 4,4'-(4,4'-isopropylidene-diphenoxy)bis(phthalic anhydride), abbreviated to BSAA.

Moreover, the above-mentioned amine-capped aniline oligomer is with a general formula as following:

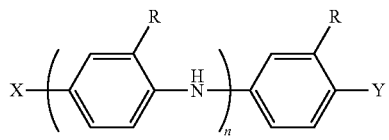

wherein n is an integer ranges from 2 to 40; X and Y are independently selected from the group consisting of: $-NH_2$, $-C_6H_4NH_2$, $-OC_6H_4NH_2$; R is selected from the group consisting of H, $-OH$, $-COOH$, alkyl, aryl, alkoxy, halogen, $-NO_2$, $-NH_2$.

According to the second embodiment of the present invention, a polyimide membrane is synthesized by one or more emeraldine amine-capped aniline oligomer, one or more dianhydride, and an optional diamine. The weight-average molecular weight of the polyimide membrane ranges from 50,000 to 200,000.

The selection of dianhydride and emeraldine amine-capped aniline oligomer is described in the first embodiment.

In one preferred example of the present embodiment, the polyimide membrane is with a structure formula as following:

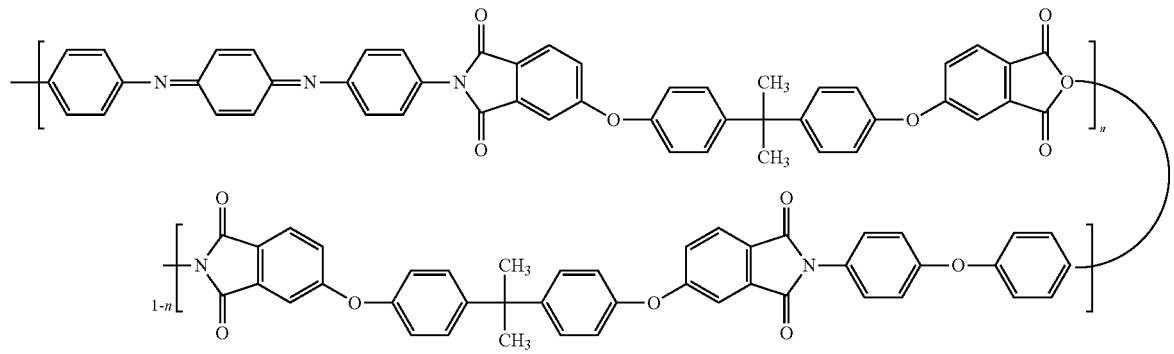

wherein n is equal to or less than 1 but is not equal to 0.

Example for Producing Amine-Capped Aniline Trimer (ACAT)

Step 1, 16 mmol of 4,4'-diaminodiphenylamine sulfate hydrate, 16 mmol of purified aniline, 60 ml of 1 M of hydrochloric acid. The mixture solution is placed in an ice bath with temperature about −5° C. and a reaction is hence occurred. The mixture may be agitated during the reaction.

Step 2, 16 mmol of ammonium persulfate is dissolved in 40 ml, 1M of hydrochloric acid, and this solution is then added into the above mixture solution in step 1.

Step 3, after several minutes, when the product becomes green color granules, agitate the mixture for about 60 minutes.

Step 4, the product is filtered by a ceramic funnel, and then the filtered products are sequentially rinsed by 80 ml of 1M hydrochloric acid and 80 ml of distilled water.

Step 5, the products of step 4 are immersed in 40 ml of 1M ammonium hydroxide, then agitating the solution for about 1 to 2 hours under room temperature.

Step 6, the product is filtered by the ceramic funnel with an air exhauster, and then rinsed by distilled water until its pH becomes neutral. The rinsed product reveals blue color.

Step 7, the product is dried by a vacuum oven, and wanted amine-capped aniline trimer (ACAT) is obtained.

After amine-capped aniline trimer (ACAT) is produced, an embodiment of the present invention employs a thermal condensation method to produce several electroactive polyimide membranes. The produced ACAT is utilized to react with BSAA and variant percentages of a diamine, such as 4,4-oxydianiline (ODA), to produce electroactive polyimide membranes having different electroactivities. The thermal condensation method and properties of the electroactive polyimide membranes are described and investigated below.

Example for Producing Electroactive Polyimide Membranes by Thermal Condensation Step 1, 1 mmol of BSAA is dissolved in 3-15 g of N,N-dimethylacetamide (DMAc) then agitated for about 30 minutes under room temperature.

Step 2, a predetermined quantity (see table 1) of ACAT and ODA are dissolved in 3-15 g of N,N-dimethylacetamide (DMAc) then agitated for about 30 minutes until the ACAT and ODA are completely dissolved. This solution is then well mixed with the solution of step 1. The mixed solution is agitated for about 3 hours.

TABLE 1

| | Composition | | |
|---|---|---|---|
| Compound code | ACAT (g) | ODA (g) | BSAA (g) |
| BSAA-ACAT | 0.289 | 0 | 0.520 |
| BSAA-ACAT/ODA(3:1)[a] | 0.217 | 0.050 | 0.520 |
| BSAA-ACAT/ODA(1:1)[a] | 0.145 | 0.100 | 0.520 |
| BSAA-ACAT/ODA(1:3)[a] | 0.072 | 0.150 | 0.520 |
| BSAA-ODA | 0 | 0.200 | 0.520 |

[a]ratio shown in parentheses is the molar ratio of ACAT to ODA.

Step 3, the mixed solution of step 2, i.e., poly(amic acid) solution, is coated onto a 6 cm×6 cm glass sheet. By using an oven or a hot plate, the glass sheet is heated step by step as follows: firstly, heat the glass sheet at 80° C. for 30 minutes; secondly, the temperature is increased to 170° C. to heat the glass sheet for 6 hours. Finally, an electroactive polyimide membrane is obtained, as shown in FIG. 1.

Properties of the polyimide membranes produced by the above monomers are investigated. An Ubbelohde viscometer is used to measure inherent viscosity ($\eta_{inh}$). A Gel Permeation Chromatography (GPC) is used to measure number-average molecular weight ($\overline{Mn}$), weight-average molecular weight ($\overline{Mw}$), and polydispersity index (PDI). Table 2 shows the measurement results. The results show that polyimide membranes produced by the embodiments have a weight-average molecular weight between 48,000 to 144,000 and an inherent viscosity between 0.47 dL/g to 0.53 dL/g. The sample with compound code BSAA-ACAT has the maximum weight-average molecular weight.

TABLE 2

| Compound code | $\eta_{inh}{}^a$ dL/g | $\overline{Mn}^b$ $10^4$ | $\overline{Mw}^b$ $10^4$ | PDI |
|---|---|---|---|---|
| BSAA-ACAT | 0.53 | 5.1 | 14.4 | 2.8 |
| BSAA-ACAT/ODA(3:1)[c] | 0.50 | 4.7 | 5.9 | 1.3 |
| BSAA-ACAT/ODA(1:1)[c] | 0.52 | 5.4 | 7.4 | 1.4 |
| BSAA-ACAT/ODA(1:3)[c] | 0.48 | 4.5 | 5.6 | 1.2 |
| BSAA-ODA | 0.47 | 3.1 | 4.8 | 1.6 |

[a]viscosity is measured by using NMP as solvent, concentration 0.5 g/dL, and tested at 30° C.
[b]use poly(methyl methacrylate) as standard solution, NMP as eluent.
[c]ratio shown in parentheses is the molar ratio of ACAT to ODA.

In addition, a tensile tester of Hungta Company, Taiwan, model no. HT-9120M, is used to measure mechanical properties including tensile strength, elongation at break, Young's modulus, and Storage Modulus according to American Society for Testing and Materials (ASTM) test standard D638. Table 3 shows the test results. The test results of Table 3 show that amine-capped aniline trimer (ACAT) is helpful to promote and improve mechanical properties of the polyimide membranes. Compared with the non-electroactive sample BSAA-ODA, the electroactive sample BSAA-ACAT respectively promotes the tensile strength and Young's modulus by 217% and 223%. Table 3 also shows test results of some comparative samples produced by methods of the prior art in which the test results are obtained by the same test instrument and test standard. As shown in Table 3, all polyimide membranes produced by the prior art have a Young's modulus less than 3 GPa; in contrast, all electroactive polyimide membranes produced by the present invention have a Young's modulus more than 3 GPa and even high to 7 GPa for the electroactive polyimide membrane BSAA-ACAT.

TABLE 3

| Compound code | Tensile strength (MPa) | Elongation at break (%) | Young's modulus (GPa) | Storage modulus (MPa) |
|---|---|---|---|---|
| BSAA-ACAT | 156.67 | 1.99 | 7.35 | 2780 |
| BSAA-ACAT/ODA(3:1) | 135.06 | 4.73 | 5.89 | 2690 |
| BSAA-ACAT/ODA(1:1) | 69.43 | 5.75 | 4.02 | 2400 |
| BSAA-ACAT/ODA(1:3) | 58.07 | 9.23 | 3.04 | 2280 |
| BSAA-ODA | 49.32 | 11.85 | 2.27 | 1640 |
| PMDA-ODA[a] | 97.2 | 22.8 | 2.16 | — |
| IPDA-ODA[b] | 92 | 11.3 | 1.7 | — |
| 6FDA-ODA[b] | 97 | 12.2 | 1.9 | — |
| PPDA-FAPP[c] | 107.7 | 7.2 | 1.92 | — |
| BPDA-FAPP[c] | 109.4 | 8.0 | 2.04 | — |
| PPDA-PAPP[c] | 106.9 | 6.9 | 2.58 | — |
| BPDA-PAPP[c] | 104.6 | 7.1 | 2.49 | — |

[a, b, c]are respectively synthesized by the following prior art:
[a]"Preparation and characterization of polyimide-mesoporous silica hybrid nanocomposites based on water-soluble poly(amic acid) ammonium salt." European Polymer Journal, vol. 45, 19-29 (2009).
[b]"Synthesis and properties of aromatic polyimide, poly (benzoxazole imide), and poly (benzoxazole amide imide)." Journal of Applied Polymer Science, Vol. 113, 2301-2312 (2009).
[c]"Synthesis and properties of new poly(ether imides) based on pyridine-containing aromatic dianhydride and diamine monomers." Journal of Applied Polymer Science, Vol. 113, 1438-1447 (2009).

Figure 2:
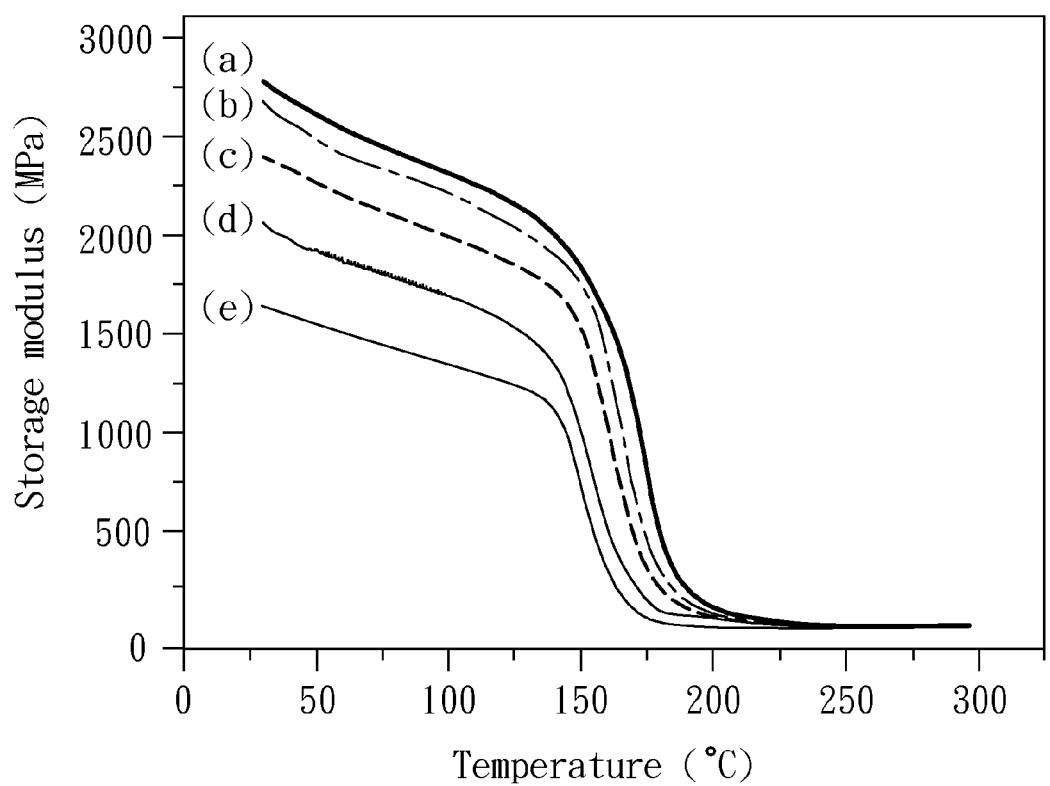
FIG. 2 shows stress-strain curves of the polyimide membranes produced by embodiments of the present invention.

FIG. 2 shows stress-strain curves of the produced polyimide membranes in which a sine waveform or other types of temperature stresses are exerted on the test samples and the strains are analyzed by a dynamic mechanical analyzer, wherein curve (a) to (e) respectively denotes stress-strain curve of BSAA-ACAT, BSAA-ACAT/ODA (3:1), BSAA-ACAT/ODA (1:1), BSAA-ACAT/ODA (1:3), and BSAA-ODA. As shown in FIG. 2, as the percentage of ACAT is increased the Storage modulus is promoted.

Figure 3:
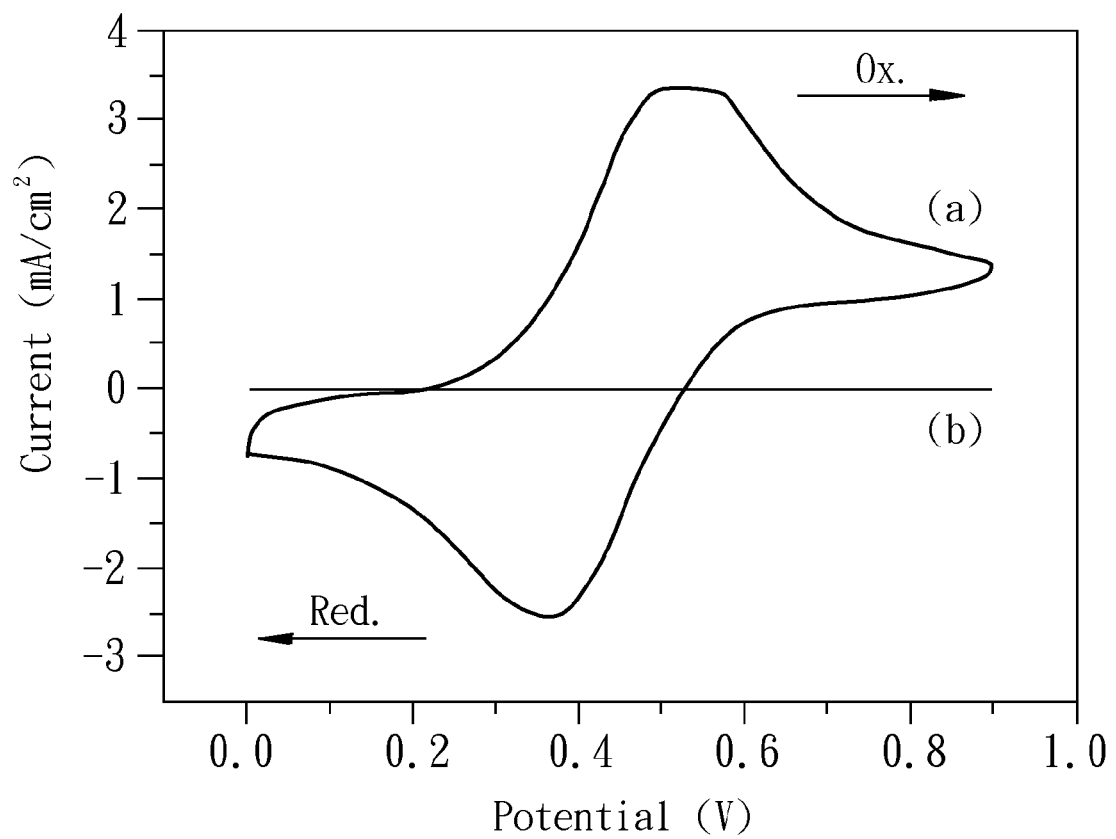
FIG. 3 is cyclic voltammetry (CV) analysis of polyimide produced by embodiments of the present invention.

FIG. 3 is cyclic voltammetry (CV) analysis of polyimide produced by embodiments of the present invention. The CV analysis is made through two working electrodes in 1M of sulfuric acid with scan rate 50 my/s, and the two working electrodes are made by coating BSAA-ACAT and BSAA-ODA on the platinum electrode respectively. In FIG. 3, curve (a) denotes CV of BSAA-ACAT and curve (b) denotes CV of BSAA-ODA. As shown in FIG. 3, curve (a) appears oxidation peak and reduction peak but curve (b) appears none. This proves that the polyimide produced by the present invention is electroactive and reversible.

Notice that in other embodiments of the present invention, in order to adjust electroactivity or other properties of polyimide membrane, other monomers such as amine-capped aniline pentamer (5-mer), amine-capped aniline heptamer (7-mer), other amine-capped aniline oligomers, or the combination thereof may be used to synthesize polyimide for increasing its conjugate section.

As disclosed above, the preferred embodiment utilizes an oxidation-coupled one-step method to synthesize emeraldine amine-capped aniline trimer (ACAT), and then use it with a non-coplanar dianhydride (such as BSAA) to synthesize polyimide. One polyimide membrane produced by such method has weight-average molecular weight about 140,000 and Young's modulus about 7 GPa. In addition, methods of the present invention prove that the imidization reaction can be completed through the emeraldine amine-capped aniline trimer (ACAT), and thus a complete oxidation step can be omitted, thereby simplifying the manufacturing steps and improving the strength and workability of the polyimide membrane.

Although specific embodiments have been illustrated and described, it will be appreciated by those skilled in the art that various modifications may be made without departing from the scope of the present invention, which is intended to be limited solely by the appended claims.

What is claimed is:

1. A polyimide membrane synthesized by one or more emeraldine amine-capped aniline oligomers, one or more dianhydrides, and an optional diamine, whereby the Young's Modulus of the polyimide membrane is equal to or more than 3 GPa.

2. The polyimide membrane as recited in claim 1, wherein the dianhydrides comprise one selected from the group consisting of the following:
   Benzophenone tetracarboxylic dianhydride,
   2,3,6,7-naphthalene tetracarboxylic dianhydride,
   3,3',4,4'-diphenyl tetracarboxylic dianhydride,
   1,2,5,6-naphthalene tetracarboxylic dianhydride,
   2,2',3,3'-diphenyl tetracarboxylic dianhydride,
   2,2-bis(3,4-dicarboxyphenyl)propane dianhydride,
   3,4,9,10-perylene tetracarboxylic dianhydride,
   bis(3,4-dicarboxyphenyl)ether dianhydride,
   ethylene tetracarboxylic dianhydride,
   naphthalene-1,2,4,5-tetracarboxylic dianhydride,
   naphthalene-1,4,5,8-tetracarboxylic dianhydride,
   decahydronaphthalene-1,4,5,8-tetracarboxylic dianhydride,
   4,8-dimethyl-1,2,3,5,6,7-hexahydronaphthalene-1,2,5,6-tetracarboxylic dianhydride,
   2,6-dichloronaphthalene-1,4,5,8-tetracarboxylic dianhydride,
   2,7-dichloronaphthalene-1,4,5,8-tetracarboxylic dianhydride, 2,3,6,7-dichloronaphthalene-1,4,5,8-tetracarboxylic dianhydride,
phenanthrene-1,8,9,10-tetracarboxylic dianhydride,
cyclopentane-1,2,3,4-tetracarboxylic dianhydride,
pyrrolidine-2,3,4,5-tetracarboxylic dianhydride,
pyrazine-2,3,4,5-tetracarboxylic dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
bis(2,3-dicarboxyphenyl)sulfone dianhydride,
benzene-1,2,3,4-tetracarboxylic dianhydride,
1,2,3,4-butane tetracarboxylic dianhydride,
thiophene-2,3,4,5-tetracarboxylic dianhydride, and
4,4'-(4,4'-isopropylidene-diphenoxy)bis(phthalic anhydride), abbreviated to BSAA.

3. The polyimide membrane as recited in claim 1, wherein the one or more amine-capped aniline oligomers have a general formula as following:

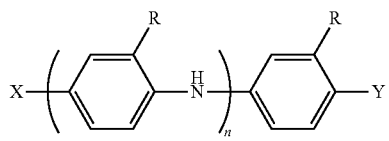

wherein n is an integer ranges from 2 to 40; X and Y are independently selected from the group consisting of: —NH$_2$, —C$_6$H$_4$NH$_2$, —OC$_6$H$_4$NH$_2$; R is selected from the group consisting of H, —OH, —COOH, alkyl, aryl, alkoxy, halogen, —NO$_2$, —NH$_2$.

4. The polyimide membrane as recited in claim 1, wherein the polyimide membrane is with a structure formula as following:

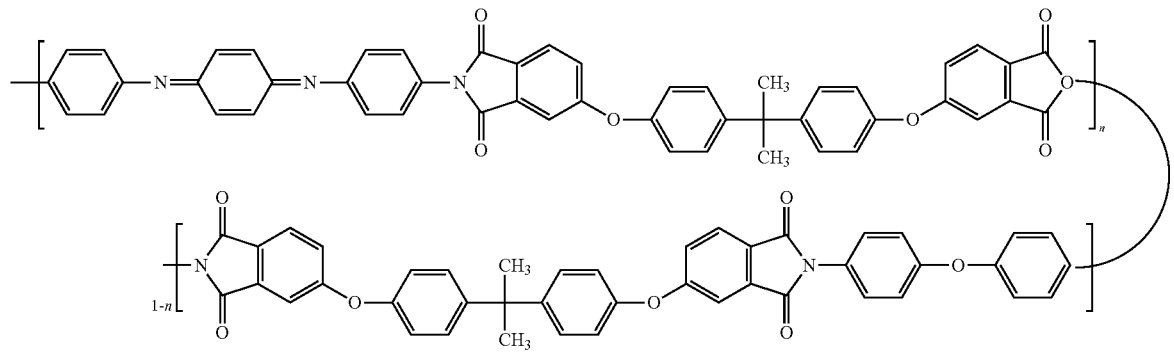

wherein n is equal to or less than 1 but is not equal to 0.

5. The polyimide membrane as recited in claim 1, wherein the one or more amine-capped aniline oligomers are used to synthesize the polyimide membrane for increasing its conjugate section and adjust its electroactivity or other properties.

6. A polyimide membrane synthesized by one or more emeraldine amine-capped aniline oligomers, one or more dianhydrides, and an optional diamine, whereby the weight-average molecular weight of the polyimide membrane ranges from 50,000 to 200,000.

7. The polyimide membrane as recited in claim 6, wherein the dianhydrides comprise one selected from the group consisting of the following:
Benzophenone tetracarboxylic dianhydride,
2,3,6,7-naphthalene tetracarboxylic dianhydride,
3,3',4,4'-diphenyl tetracarboxylic dianhydride,
1,2,5,6-naphthalene tetracarboxylic dianhydride,
2,2',3,3'-diphenyl tetracarboxylic dianhydride,
2,2-bis(3,4-dicarboxyphenyl)propane dianhydride,
3,4,9,10-perylene tetracarboxylic dianhydride,
bis(3,4-dicarboxyphenyl)ether dianhydride,
ethylene tetracarboxylic dianhydride,
naphthalene-1,2,4,5-tetracarboxylic dianhydride,
naphthalene-1,4,5,8-tetracarboxylic dianhydride,
decahydronaphthalene-1,4,5,8-tetracarboxylic dianhydride,
4,8-dimethyl-1,2,3,5,6,7-hexahydronaphthalene-1,2,5,6-tetracarboxylic dianhydride,
2,6-dichloronaphthalene-1,4,5,8-tetracarboxylic dianhydride,
2,7-dichloronaphthalene-1,4,5,8-tetracarboxylic dianhydride,
2,3,6,7-dichloronaphthalene-1,4,5,8-tetracarboxylic dianhydride,
phenanthrene-1,8,9,10-tetracarboxylic dianhydride,
cyclopentane-1,2,3,4-tetracarboxylic dianhydride,
pyrrolidine-2,3,4,5-tetracarboxylic dianhydride,
pyrazine-2,3,4,5-tetracarboxylic dianhydride,
2,2-bis(2,3-dicarboxyphenyl)propane dianhydride,
1,1-bis(2,3-dicarboxyphenyl)ethane dianhydride,
1,1-bis(3,4-dicarboxyphenyl)ethane dianhydride,
bis(2,3-dicarboxyphenyl)methane dianhydride,
bis(3,4-dicarboxyphenyl)methane dianhydride,
bis(2,3-dicarboxyphenyl)sulfone dianhydride,
benzene-1,2,3,4-tetracarboxylic dianhydride,
1,2,3,4-butane tetracarboxylic dianhydride,
thiophene-2,3,4,5-tetracarboxylic dianhydride, and
4,4'-(4,4'-isopropylidene-diphenoxy)bis(phthalic anhydride), abbreviated to BSAA.

8. The polyimide membrane as recited in claim 6, wherein the one or more amine-capped aniline oligomers have a general formula as following:

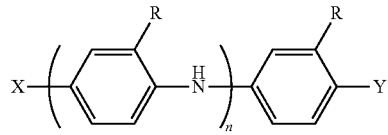

wherein n is an integer ranges from 2 to 40; X and Y are independently selected from the group consisting of: —NH$_2$, —C$_6$H$_4$NH$_2$, —OC$_6$H$_4$NH$_2$; R is selected from the group consisting of H, —OH, —COOH, alkyl, aryl, alkoxy, halogen, —NO$_2$, —NH$_2$.

9. The polyimide membrane as recited in claim 6, wherein the polyimide membrane is with a structure formula as following:

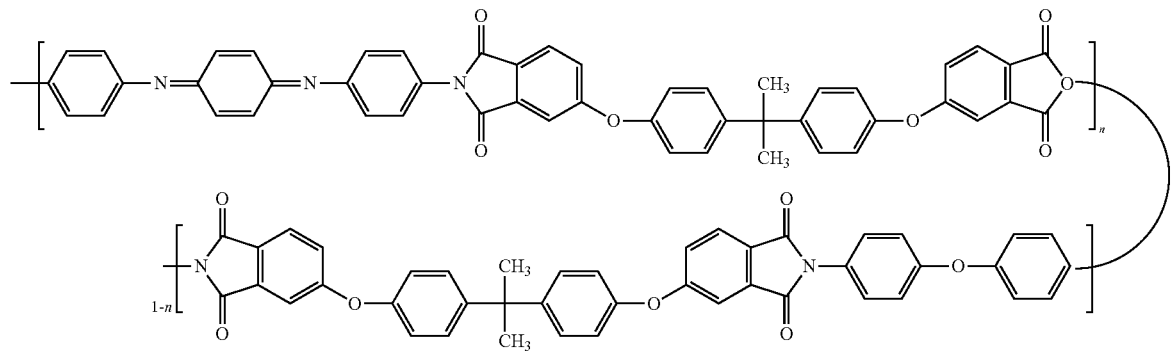

wherein n is equal to or less than 1 but is not equal to 0.

10. The polyimide membrane as recited in claim 6, wherein the one or more amine-capped aniline oligomers are used, to synthesize the polyimide membrane for increasing its conjugate section, and, adjust its electroactivity or other properties.

* * * * *